US008887055B2

(12) United States Patent
Crain et al.

(10) Patent No.: US 8,887,055 B2
(45) Date of Patent: *Nov. 11, 2014

(54) METHODS AND DEVICES FOR RECORDING CHANGES IN VISUAL STIMULI OBSERVED THROUGH BROWSER-BASED INTERFACES

(75) Inventors: Kenneth H. Crain, Irving, TX (US); William K. Vanover, Crowley, TX (US)

(73) Assignee: Schlucktronix LLC, Las Vegas, NV (US)

( * ) Notice: Subject to any disclaimer, the term of this patent is extended or adjusted under 35 U.S.C. 154(b) by 859 days.

This patent is subject to a terminal disclaimer.

(21) Appl. No.: 12/854,092

(22) Filed: Aug. 10, 2010

(65) Prior Publication Data
US 2010/0306661 A1 Dec. 2, 2010

Related U.S. Application Data

(63) Continuation of application No. 09/812,405, filed on Mar. 19, 2001, now Pat. No. 7,774,716.

(60) Provisional application No. 60/190,430, filed on Mar. 17, 2000.

(51) Int. Cl.
G06F 3/00 (2006.01)
G06Q 10/10 (2012.01)
G06Q 30/02 (2012.01)
G06F 17/30 (2006.01)

(52) U.S. Cl.
CPC .............. *G06Q 30/02* (2013.01); *G06Q 10/109* (2013.01); *G06F 17/30867* (2013.01)
USPC ........... 715/733; 715/744; 715/745; 715/760; 715/802; 715/853; 715/863; 709/220; 709/231

(58) Field of Classification Search
USPC .......... 715/733, 744, 745, 760.802, 853, 863; 709/220, 231
See application file for complete search history.

(56) References Cited

U.S. PATENT DOCUMENTS 4,878,179 A * 10/1989 Larsen et al. ............... 716/136
5,544,354 A * 8/1996 May et al. ............... 1/1
(Continued)

FOREIGN PATENT DOCUMENTS

| EP | 0944009 | 9/1999 |
| WO | WO-9810349 | 3/1998 |
| WO | WO-9940525 | 8/1999 |

OTHER PUBLICATIONS

Nakajima et al.; Transformation of Web Event Sequences for Analysis of Users' Web Operation; © 1999; IEEE; 6 pages.*

(Continued)

Primary Examiner — Linh K Pham
(74) Attorney, Agent, or Firm — Perkins Coie LLP

(57) ABSTRACT

The disclosed technology reconstructs stimuli displayed to a user as they interact with online-content. The technology may provide for a record of selected technical parameters and relevant data that may impact the manner in which online content is displayed, taking into consideration the current browser context. The technology may record events as reported from a browser interface. The events may be recorded in a format and syntax to form a primary index of events and related outcomes which comprise the user's interface experience. Events may be detected at the browser interface and identified, categorized, and filtered as to their relevance to visual stimuli. A unique identifier may then be assigned in the form of an alphanumeric string to each relevant event. Selected events may be recorded into a log (along with their categorization), a unique identifier, and the time in which the event occurred.

23 Claims, 8 Drawing Sheets

(56) References Cited

U.S. PATENT DOCUMENTS

| | | | | |
|---|---|---|---|---|
| 5,564,005 | A | * | 10/1996 | Weber et al. ............... 715/863 |
| 5,625,783 | A | | 4/1997 | Ezekiel et al. |
| 5,737,726 | A | | 4/1998 | Cameron et al. |
| 5,786,814 | A | | 7/1998 | Moran et al. |
| 5,890,152 | A | * | 3/1999 | Rapaport et al. ............... 1/1 |
| 5,893,053 | A | | 4/1999 | Trueblood |
| 5,928,330 | A | * | 7/1999 | Goetz et al. ............... 709/231 |
| 5,951,643 | A | | 9/1999 | Shelton et al. |
| 5,960,200 | A | | 9/1999 | Eager et al. |
| 6,023,270 | A | * | 2/2000 | Brush et al. ............... 715/741 |
| 6,033,076 | A | * | 3/2000 | Braeuning et al. ......... 351/224 |
| 6,035,332 | A | | 3/2000 | Ingrassia, Jr. et al. |
| 6,046,741 | A | | 4/2000 | Hochmuth |
| 6,052,512 | A | * | 4/2000 | Peterson et al. ............. 709/220 |
| 6,084,584 | A | | 7/2000 | Nahi et al. |
| 6,101,510 | A | | 8/2000 | Stone et al. |
| 6,112,181 | A | | 8/2000 | Shear et al. |
| 6,236,884 | B1 | * | 5/2001 | Hunter et al. ............... 600/544 |
| 6,263,365 | B1 | | 7/2001 | Scherpbier |
| 6,272,467 | B1 | | 8/2001 | Durand et al. |
| 6,385,590 | B1 | | 5/2002 | Levine |
| 6,418,471 | B1 | | 7/2002 | Shelton et al. |
| 6,456,305 | B1 | | 9/2002 | Qureshi et al. |
| 6,457,004 | B1 | * | 9/2002 | Nishioka et al. ............... 1/1 |
| 6,496,803 | B1 | | 12/2002 | Seet et al. |
| 6,546,393 | B1 | | 4/2003 | Khan |
| 6,546,397 | B1 | | 4/2003 | Rempell |
| 6,583,800 | B1 | | 6/2003 | Ridgley et al. |
| 6,667,751 | B1 | | 12/2003 | Wynn et al. |
| 6,675,162 | B1 | | 1/2004 | Russell-Falla et al. |
| 6,690,394 | B1 | | 2/2004 | Harui |
| 7,243,310 | B2 | | 7/2007 | Crain et al. |
| 7,444,399 | B2 | | 10/2008 | Crain et al. |
| 7,774,716 | B2 | | 8/2010 | Crain et al. |
| 2002/0002562 | A1 | * | 1/2002 | Moran et al. ............... 707/500 |
| 2002/0169650 | A1 | | 11/2002 | Dougherty et al. |
| 2002/0194018 | A1 | | 12/2002 | Scott |
| 2002/0198733 | A1 | | 12/2002 | Sawa et al. |
| 2003/0046244 | A1 | | 3/2003 | Shear et al. |
| 2003/0069749 | A1 | | 4/2003 | Shear et al. |
| 2003/0135400 | A1 | | 7/2003 | Mellander |
| 2004/0064358 | A1 | | 4/2004 | Hill et al. |

OTHER PUBLICATIONS

Nakajima A., et al; "Transformation of Web Event Sequences for Analysis of User's Web Operation" 1999 IEEE International Conference of Systems Man and Cybernetics. Tokyo Research Laboratory, vol. 4 of 6, Oct. 19, 1999, pp. 111-116.

"Web Display Profiling", Research Disclosure, Kenneth Mason Publication, Hampshire, GB No. 427, Nov. 1999, pp. 1522.

United States Patent and Trademark Office, U.S. Appl. No. 09/812,405, Non-Final Office Action, mailed Aug. 13, 2003, 12 pages.

United States Patent and Trademark Office, U.S. Appl. No. 09/812,405, Final Office Action, mailed May 6, 2004, 15 pages.

United States Patent and Trademark Office, U.S. Appl. No. 09/812,405, Advisory Action, mailed Oct. 5, 2004, 3 pages.

United States Patent and Trademark Office, U.S. Appl. No. 09/812,405, Non-Final Office Action, mailed Jan. 26, 2005, 12 pages.

United States Patent and Trademark Office, U.S. Appl. No. 09/812,405, Final Office Action, mailed Jul. 27, 2005, 15 pages.

United States Patent and Trademark Office, U.S. Appl. No. 09/812,405, Non-Final Office Action, mailed Apr. 20, 2006, 14 pages.

United States Patent and Trademark Office, U.S. Appl. No. 09/812,405, Final Office Action, mailed Oct. 11, 2006, 12 pages.

United States Patent and Trademark Office, U.S. Appl. No. 09/812,405, Examiner's Answer to Appeal Brief, mailed Oct. 3, 2007, 13 pages.

United States Patent and Trademark Office, U.S. Appl. No. 09/812,405, Examiner's Answer to Appeal Brief, mailed Jan. 11, 2008, 13 pages.

United States Patent and Trademark Office, U.S. Appl. No. 09/812,405, Patent Board Decision, mailed Jan. 14, 2010, 14 pages.

United States Patent and Trademark Office, U.S. Appl. No. 09/812,405, Notice of Allowance, mailed Mar. 24, 2010, 6 pages.

United States Patent and Trademark Office, Non-Final Office Action, U.S. Appl. No. 09/812,391, mailed Mar. 5, 2004, 7 pages.

United States Patent and Trademark Office, Final Office Action, U.S. Appl. No. 09/812,391, mailed Jan. 5, 2005, 8 pages.

United States Patent and Trademark Office, Advisory Action, U.S. Appl. No. 09/812,391, mailed Jun. 2, 2005, 2 pages.

United States Patent and Trademark Office, Non-Final Office Action, U.S. Appl. No. 09/812,391, mailed May 3, 2006, 9 pages.

United States Patent and Trademark Office, Notice of Allowance, U.S. Appl. No. 09/812,391, mailed Jan. 4, 2007, 7 pages.

United States Patent and Trademark Office, Non-Final Office Action, U.S. Appl. No. 09/813,231, mailed Aug. 20, 2004, 10 pages.

United States Patent and Trademark Office, Final Office Action, U.S. Appl. No. 09/813,231, mailed Jun. 19, 2007, 9 pages.

United States Patent and Trademark Office, Non-Final Office Action, U.S. Appl. No. 09/813,231, mailed Sep. 11, 2007, 11 pages.

United States Patent and Trademark Office, Notice of Allowance, U.S. Appl. No. 09/813,231, mailed Jun. 26, 2008, 7 pages.

* cited by examiner

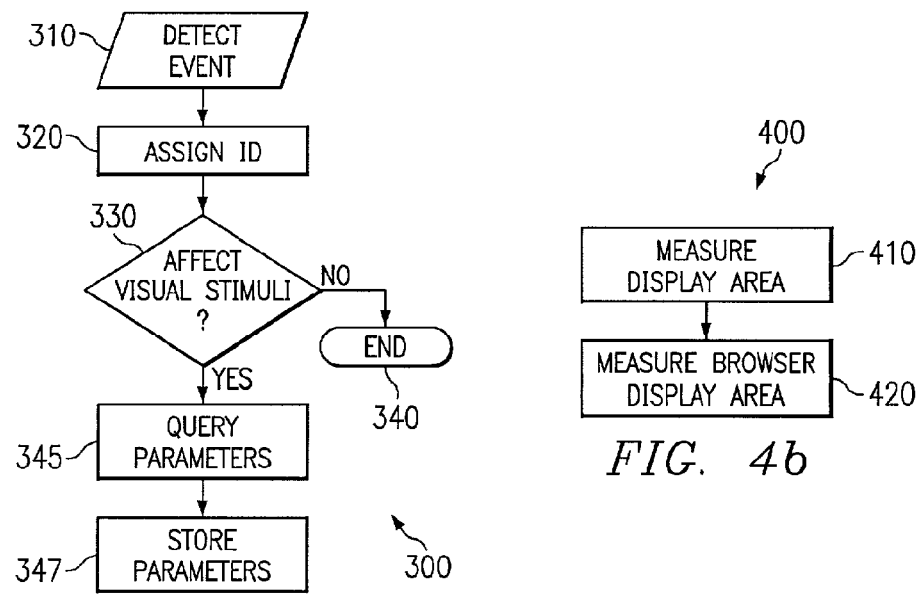
FIG. 3
FIG. 4b
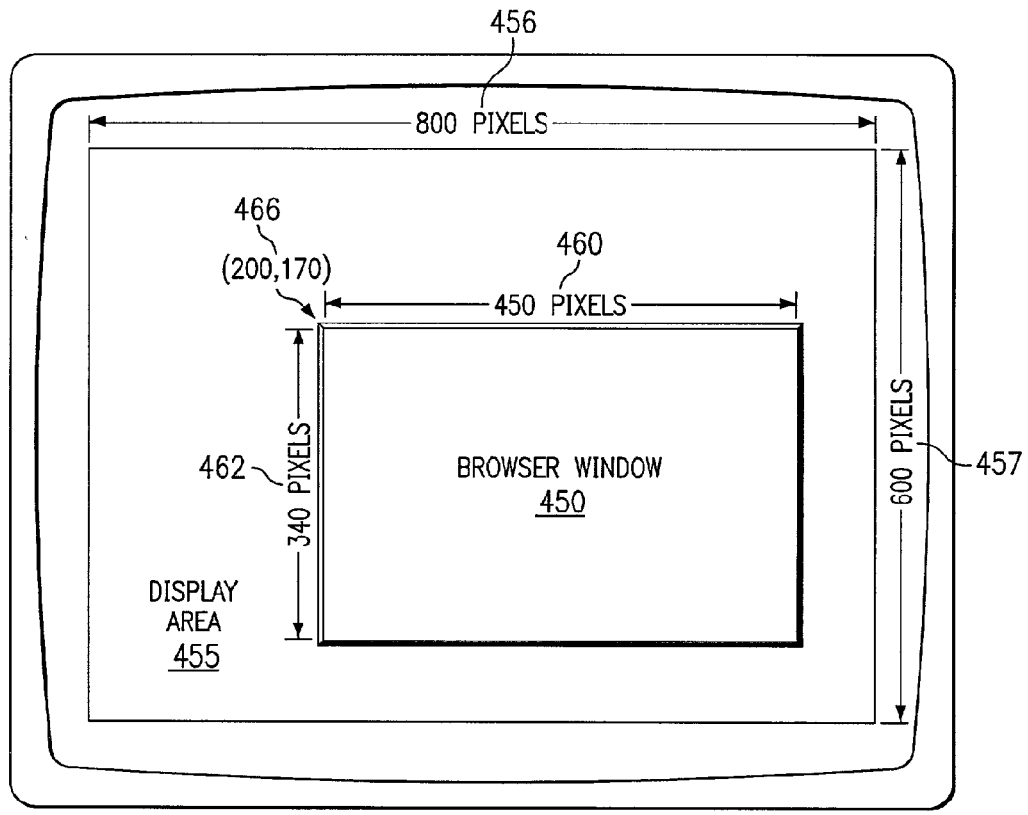
FIG. 4

METHODS AND DEVICES FOR RECORDING CHANGES IN VISUAL STIMULI OBSERVED THROUGH BROWSER-BASED INTERFACES

CROSS-REFERENCE TO RELATED APPLICATIONS

This application is a continuation of U.S. patent application Ser. No. 09/812,405 entitled "METHODS AND DEVICES FOR RECORDING CHANGES IN VISUAL STIMULI OBSERVED THROUGH BROWSER-BASED INTERFACES", filed Mar. 19, 2001, now U.S. Pat. No. 7,774,716, which claims priority to provisional U.S. patent application No. 60/190,430 entitled "METHOD AND APPARATUS FOR RECORDING CHANGES IN VISUAL STIMULI OBSERVED THROUGH BROWSER-BASED INTERFACES", filed Mar. 17, 2000, both of which are incorporated by reference herein in their entireties. This application is also related to U.S. patent application Ser. No. 09/812,391 filed Mar. 19, 2001 (now U.S. Pat. No. 7,243,310) and U.S. patent application Ser. No. 09/813,231 filed Mar. 19, 2001 (now U.S. Pat. No. 7,444,399), both of which are incorporated by reference herein in their entireties.

BACKGROUND

1. Technical Field

The present invention relates generally to computer systems, and browser-based interfaces used to display online-content to a user. More specifically, the invention relates to methods and devices for identifying and recording parameters that relate to visual stimuli displayed to a user through browser-based interfaces.

2. Problem Statement

As near instant access to information through the information-browser model becomes a mainstay of global commerce, increased attention is being focused on the usability and clarity of purpose of online-content as it is displayed to a user. Being able to record the visual stimuli that is being presented to the user at any given time enables the study of how users react to that stimuli. Accordingly, the ability to accurately and efficiently record online-content is becoming a critical goal the a content design process.

One barrier to studying the visual stimuli people observe while interacting with on-line content though a browser is the inflexibility of the browser interface itself. It is known that online-content contains a variety of textual and binary (typically encompassing graphics) data that is interpreted by a browser and displayed to a user. The manner in which this content is displayed is not only dependent on the type of browser being used, but also the environmental context in which the browser is being used. For example, a web page that appears one way when displayed in a Microsoft based browser will appear entirely different when displayed in a Netscape based browser.

A number of technologies exist that can produce a transactional record of the actual network address of online-content viewed by a user (such as an Internet Uniform Resource Locator or URL), and that this content can be revisited thereby recreating the general user interface experience. However, given the complexity in how online-content can actually be displayed to a user through a browser-based interface, those wishing to recreate the user's interface experience by reconstructing what visual stimuli was visible at any specific point in time for the purposes of real-time or post-analysis have few options available. Therefore, it is desired to have a system that enables the recreation of the visual stimuli actually viewed by a user of a browser-interface. Unfortunately, available systems fail to provide adequate solutions.

One approach is to generalize usage parameters using standards such as browser version and manufacturer, operating system version and manufacturer, and display size and aspect ratio (resolution expressed in terms of the visible horizontal and vertical pixels). One deficiency in this approach is that it does not take into consideration many of the technical parameters that significantly impact visual stimuli. Another deficiency in this approach is that it does not provide for a method of maintaining reconstructable data representative of visual stimuli.

Another approach is to present the user with a "fixed" set of parameters in a controlled environment with the specific purpose of gathering usage information for post-exposure analysis, such as in a usability laboratory. One deficiency in this approach is that it does not afford the user a "natural" interface experience that is representative of a real-world environment. In such a real-world environment, the user would normally have absolute control over the size and position of the browser window and horizontal and/or vertical offset of the online-content displayed within that window. As with other conventional approaches, specific limiting standards are imposed on a user rather than simply recording technical parameters as the user interacts with the online-content. Accordingly, there is a need for methods and devices for identifying and recording information regarding visual stimuli as the visual stimuli is presented to users while interacting with online-content.

SUMMARY OF THE INVENTION

The present invention provides technical advantages to the problems encountered when attempting to accurately reconstruct visual stimuli being displayed to a user as they interact with online-content, typically through a browser interface. In one embodiment, the invention provides for the browser to maintain a record of selected technical parameters and relevant data that may impact the manner in which online-content is being displayed to the user, taking into consideration the current context in which the browser is being operated.

In one embodiment, the invention is a device for interpreting specific events as reported from a browser interface. The events are recorded in a selected format and syntax to form a primary index of events and related outcomes which comprise the user's interface experience. In operation, the devices detects events as detected at the browser interface. Next, the devices identifies, categorizes, and filters detected events as to their relevance to the visual stimuli being presented to the user. The devices then assigns a unique identifier, preferably in the form of an alphanumeric string, to each relevant event. Furthermore, the devices records selected events into a log (along with their categorization), a unique identifier, and the time in which the event occurred.

In another embodiment, the invention is a method for identifying events and related parameters that impact visual stimuli being displayed to a user as the user interacts with online-content, preferably using a browser interface. The method compares preferably categorized events against known event categories (known event categories are known to cause a specific change in the visual stimuli displayed to a user). Next, the method triggers an apparatus to record relevant parameters that have changed as a result of the event.

Yet another embodiment is a device that records changes in parameters that may impact the visual stimuli. The device performs readings of several parameters, including the horizontal position, vertical position, and size of each instance of a browser window currently being displayed, along with the network address, horizontal offset, and vertical offset of online-content current being displayed within each browser window. Next, the device records these parameters in a log file in such a manner that they are related to the original event, preferably by using an unique identifier associated with the original event.

The methods may be embodied as manufactured devices. For example, the methods may be placed on a computer readable medium, such as a computer diskette, CD ROM, or other memory device. In addition, the methods may be placed in a computer memory or hard-written onto a processor to enable a general computing device to be transformed into a specific computing machine, or specific system. A computer system may be set up as a network capable of executing any of the methods. One such network could be the internet, and the network could employ an application service provider. In addition, the invention may be embodied as one or more data signals that transform a general network into a task-specific network (or, task specific distributed machine).

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following detailed description. To better understand the invention, the detailed description should be read in conjunction with the drawings in which:

FIG. 3 provides a block-flow diagram of a method for recording events and subsequent changes in visual stimuli;

FIG. 4 illustrates a browser perspective of a display a algorithm;

FIG. 4b is a block-flow diagram of a display algorithm;

FIG. 5b illustrates a content algorithm;

FIG. 6b is a flow-diagram of an offset algorithm;

DETAILED DESCRIPTION OF A BEST MODE

Figure 1:
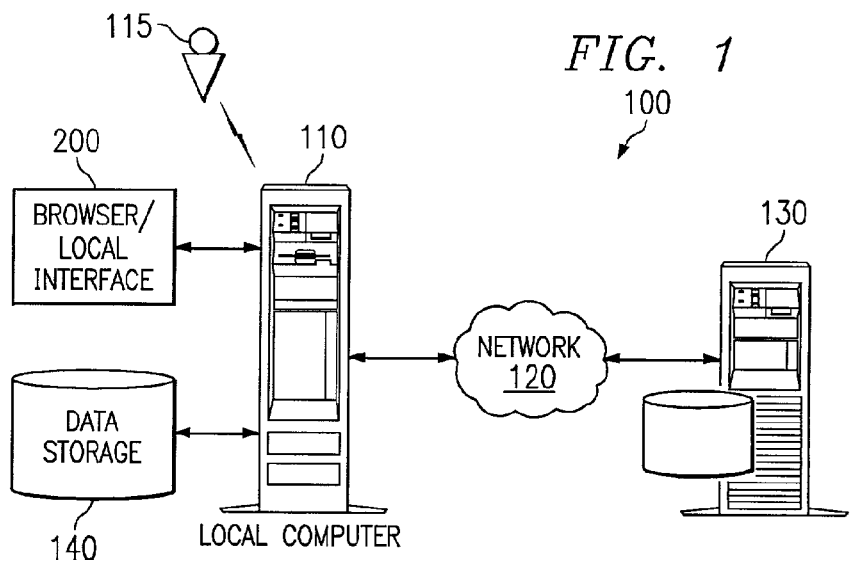
FIG. 1 illustrates components of a browser-based interface system.

The present invention provides methods and devices to identify and record parameters that may relate to visual stimuli displayed to a user as they interact with online-content using a browser-based interface.

Interpretative Considerations

When reading this section (Detailed Description of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in .sctn. 112, paragraph 6 of 35 U.S.C., unless used as "means for -functioning-" or "step for -functioning-" in the claims section.

Computer Systems as Software Platforms

A computer system (or, system) typically includes hardware capable of executing machine-readable instructions, as well as the software for executing acts (typically machine-readable instructions) that produce a desired result. In addition, a computer system may include hybrids of hardware and software, as well as computer sub-systems.

Hardware generally includes processor-capable platforms, such as client-machines (also known as personal computers or servers), and hand-held processing devices (such as smart phones, personal digital assistants (PDAs), or personal computing devices (PCDs), for example. Furthermore, hardware typically includes any physical devices that are capable of storing machine-readable instructions, such as memory or other data storage devices. Other forms of hardware include hardware sub-systems, including transfer devices such as modems, modem cards, ports, and port cards, for example. The way hardware is organized within a system is known as the system's architecture (discussed below).

Software includes machine code stored in memory, such as RAM or ROM, or machine code stored on devices (such as floppy disks, or a CD ROM, for example). Software may include executable code, an operating system, or source or object code, for example. In addition, software encompasses any set of instructions capable of being executed in a client machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method which comprises acts. In the present discussion, sometimes acts are referred to as steps to help the reader more completely understand the exemplary embodiment.

Software also includes description code. Description code specifies variable values and uses these values to define attributes for a display, such as the placement and color of an item on a displayed page. For example, the Hypertext Transfer Protocol (HTTP) is the software used to enable the Internet and is a description software language.

Hybrids (combinations of software and hardware) are becoming more common as devices for providing enhanced functionality and performance to computer systems. A hybrid is created when traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer sub-systems are combinations of hardware or software (or hybrids) that perform some specific task. For example, one computer sub-system is a soundcard. A soundcard provides hardware connections, memory, and hardware devices for enabling sounds to be produced and recorded by a computer system. Likewise, a soundcard may also include software needed to enable a computer system to "see" the soundcard, recognize the soundcard, and drive the soundcard.

Sometimes the methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data structures are defined organizations of data and enable an embodiment of the invention. For example, a data structure may provide an organization of data, or an organization of executable code (executable software). Furthermore, data signals are carried across transmission mediums and store and transport various data structures, and, thus, may be used to transport the invention. It should be noted in the following discussion that acts with like names are performed in like manners, unless otherwise stated.

DESCRIPTION OF THE DRAWINGS

Illustrative Architecture

Many persons are familiar with the way a computer network is set up—the way a computer network is set up is technically referred to as a etwork architecture. FIG. 1 illustrates a specific form of a network architecture, which is a browser-interface architecture 100 configured to support the invention across a network 120. A user 115 interacts with online-content by issuing requests and receiving data using a browser-interface 200, via a host computer 130. A browser-interface 200 interprets, renders, and presents information to the user 115 in the form of visual stimuli. Common browser interfaces include monitors, audio speakers, keyboards, microphones, a mouse, and other forms of audio/visual input or output, as well as other forms of data input. Common host computers include computing machines that operate using network software, as well as Windows, Sun, and Microsoft operating system, for example.

The invention operates in conjunction with the browser-interface 200 to detect events that may cause changes in the parameters (or "technical parameters", in the form of data) that may impact the visual stimuli being displayed to the user 115. The invention then records those parameters that are relevant to the immediate visual stimuli being displayed to the user 115 in a predetermined format to a data storage device 140. The data storage device 140 may be local to computer 110, or remote from computer 110 such as storage device 123. In addition, common data storage devices include, for example, cashed memory devices, as well as electrical and photonic storage devices. The lightening bolt between the user 115 and the computer 110 represents user-based eye position feedback that provides data regarding the position on the browser interface 200 a user's eyes are looking at, as well as information about the user's eyes, such as pupil dilation.

Recording Visual Stimuli

Figure 2:
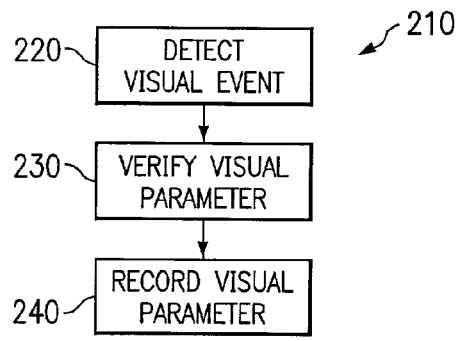
FIG. 2 shows a recording algorithm that records multiple data streams from a browser interface as the data streams occur over time.

FIG. 2 shows a recording algorithm 210 that records multiple data streams from a browser interface as the data streams occur over time. The recording algorithm 210 begins with a detect visual event act 220 in which the recording algorithm 210, which may be operating directly in the browser software, detects an event that may change a visual stimuli observed by a user. Next, the recording algorithm 210 verifies that the event detected actually impacts what the user sees at the browser interface 200 in a verify visual parameter act 230. Then, if it is verified in the verify visual parameter act 230 that the event does in fact change the visual display at the browser interface, then, in a record visual parameter act 240, the event is recorded to the data storage device 140 as described below.

Figure 2B:
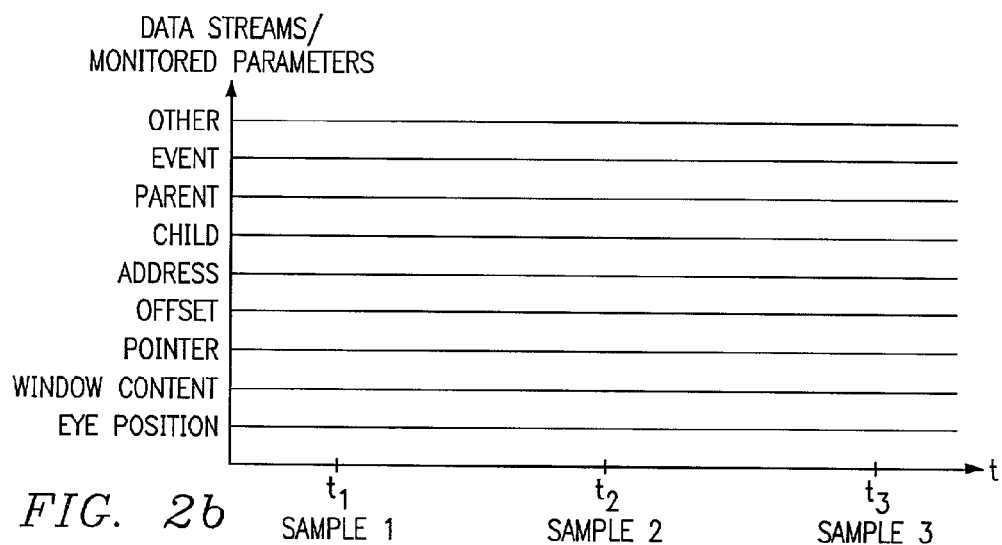
FIG. 2b is a time-line illustrating some selected sampled parameters.

FIG. 2b illustrates parameter sampling and recording in a time-line format. The browser-interface 200 is configured herein to record information in accordance with the timeline (in milliseconds). Time is illustrated on the horizontal axis.

Time shown herein is non-discrete, meaning that the time between each of the samples illustrated in FIG. 2b are not necessarily uniform, nor are they equally spaced in time, nor are they necessarily time-dependent events. The vertical axis is a non-unit based axis, and is used to illustrate parameters that may be monitored or recorded.

In one embodiment, the timeline begins when the browser-interface 200 initiates a first request and begins displaying visual stimuli to the user. As illustrated, a variety of technical parameters and data are recorded as streams in accordance with this timeline, as the browser-interface 200 detects new events (typically, as the user interacts with online-content). Parameters and other data that are recorded in accordance with this timeline may include events, the immediate size and two-dimensional position of the browser window, the network address of all online-content immediately displayed within the browser window (address), the two-dimensional offset of the online-content as it is displayed within the browser window (offset), the two-dimensional position of the pointing device (pointer), the textual and binary objects systemically displayed within each browser window (window content), a graphical image of the online content as it is immediately displayed within the browser window, a graphical image of the entire field of online-content available in its native size and aspect ratio (as would be displayed if the user were to scroll either horizontally or vertically within the browser window), and an inventory of all objects which comprise the online content and their two-dimensional position within the browser window. Other parameters that may be recorded include the user's eye position with respect to the browser interface 200 and eye dilation (eye position), size and position of a parent window (parent—discussed later), as well as size and display information regarding a child window (child—discussed later). One skilled in the art will understand that additional parameters relevant to the immediate visual stimuli being displayed to the user may be obtainable by the browser-interface or the device on which the browser is being operated, which may depend on the context in which the browser-interface is being utilized, such as browser dependent interface options, operating system settings, or other environmental variables.

Event-Based Visual Stimuli Recording

FIG. 3 provides a block-flow diagram of a method for recording events and subsequent changes in visual stimuli, embodied as a record-on-event algorithm 300 (the event algorithm 300), and will be discussed shortly. FIG. 3 can be better understood in the context of relational block-diagrams of systems that are enabled to record visual stimuli. Herein described are three such preferred embodiments of systems, illustrated as relational-block diagrams, that may record visual stimuli.

First Illustrative Embodiment

Figure 3B:
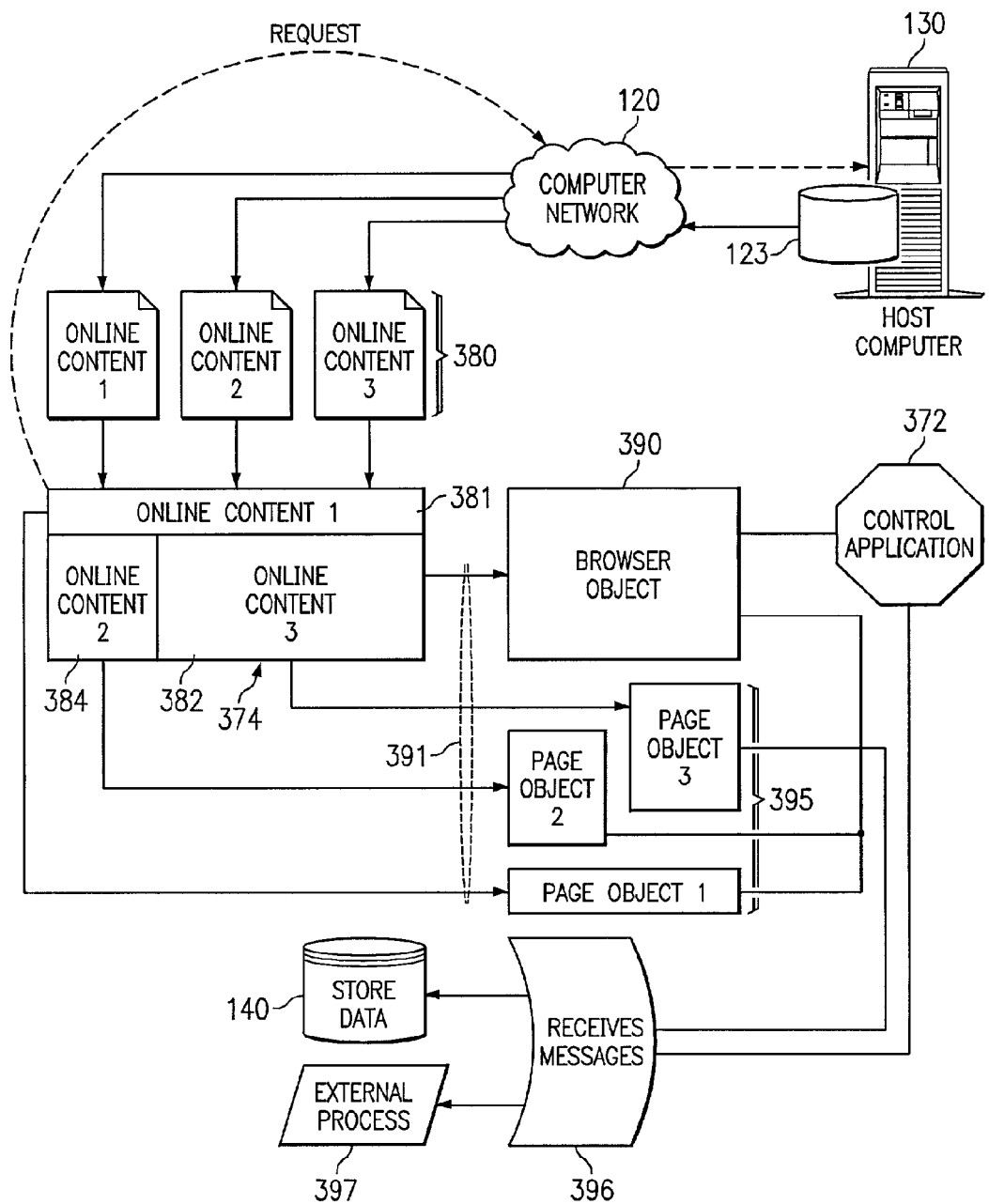
FIG. 3b illustrates a preferred embodiment of a relational block diagram of a system of the invention.

Accordingly, FIG. 3b illustrates a preferred embodiment of a relational block diagram in which a control application 372 is configured to work with a browser-interface 200 to record changes in the visual stimuli being displayed to a user 115 as the user 115 interacts with an online-content, a web page 374. The web page 374 is illustrated as a single web page, however, because the web page 374 is "framed", its content is treated in software as three separate, independent web pages (referred to as the web page's children; when the web page 374 has children, it is referred to as a parent web page). Accordingly, though each "frame page" is represented discretely as the three separated web pages 380, the online content effectively combines the three separate web pages 381, 382, and 384 (also referred individually to as "online content"), for display purposes as the online content, the web page 374.

The control program 372 creates a custom browser object 390, which in turn, is used to launch a browser interface 200 and establish a "handle" or messaging/control conduit 391 to that interface. The resulting relationship allows the custom browser object 390 to mirror the events taking place within the browser interface 200 and then report these events to a receiving aspect 396 of the control program 372. As the user requests information from a host computer 130 via a computer network 120, the host computer 130 responds by sending individual documents of online-content. As these documents are received and loaded by the browser-interface 200, the custom browser object 390 (in conjunction with the control program 372) creates any number of custom page objects 395, thereby creating a 1:1 ratio of web pages 381, 382, and 384 within the browser interface 200 to custom page objects 395 within the custom browser object 390.

Each custom page object 395 is used to monitor events taking place within its corresponding page of web pages 381, 382, and 384 and then report these events to the receiving aspect 396 of the control application 372. The receiving aspect 396 of the control application 372 monitors and records events that may cause changes in the visual stimuli being displayed to the user as new documents of online content that are instantiated in web pages 381, 382, and 384, and writes this data to a storage device 140, and/or an external process 397.

One skilled in the art will understand that there are many methods for creating custom objects 390, 395, and binding custom objects 390, 395 to other programs such as web pages 381, 382, and 384 via "handles" or messaging/control conduits 391 to a specific memory address in which the target program resides. Each method may be dependent on both the context in which the browser-interface is being utilized, and browser-dependent interface options. In a preferred embodiment of an Internet WWW browser manufactured by Microsoft Corporation® hosted on a computer running the Microsoft Windows® operating system, the CreateObject method [set me.objbrowser=CreateObject ("InternetExplorer.Application")] is used to create a custom browser object 390 and launch an instance of the browser interface 200 such that it returns a "handle" or messaging/control conduit 391 thereby allowing the custom browser object 390 to listen and control the newly instantiated browser interface 200.

In this embodiment, the control application 372, in conjunction with the custom browser object 390, is used to create an empty collection of custom page objects 395 containing variables which are in turn set to the "handle" or messaging/control conduit 391 for each new web page 381, 382, and 384 loaded within the browser interface 200 being observed by the custom browser object 390. Once the browser-interface 200 instantiates a document in an appropriate web page 381, 382, and 384, the corresponding custom page object 395 is then used to report changes in its corresponding web page 381, 382, and 384 to an aspect of the control application 372 that receives these messages 396. In this preferred embodiment, any DHTML event handle including but not limited to, Window.OnScroll (when a user scrolls the online-content within the browser window) and Window.OnResize (when a user resizes the browser window) can be monitored by binding the DHTML event handle to functions of the page object 395. Upon each DHTML event, any number of properties can be recorded from the browser window, including but not limited to, Window.Location (the network address of the online-content being displayed within the browser window), Document.Body.ClientWidth (the width of the browser window), Document.Body.ClientHeight (the height of the browser window), Document.Body.ScrollWidth (the native width of the online-content being displayed within the browser window), and Document.Body.ScrollHeight (the native height of the online-content being displayed within the browser window).

Second Illustrative Embodiment

Figure 3C:
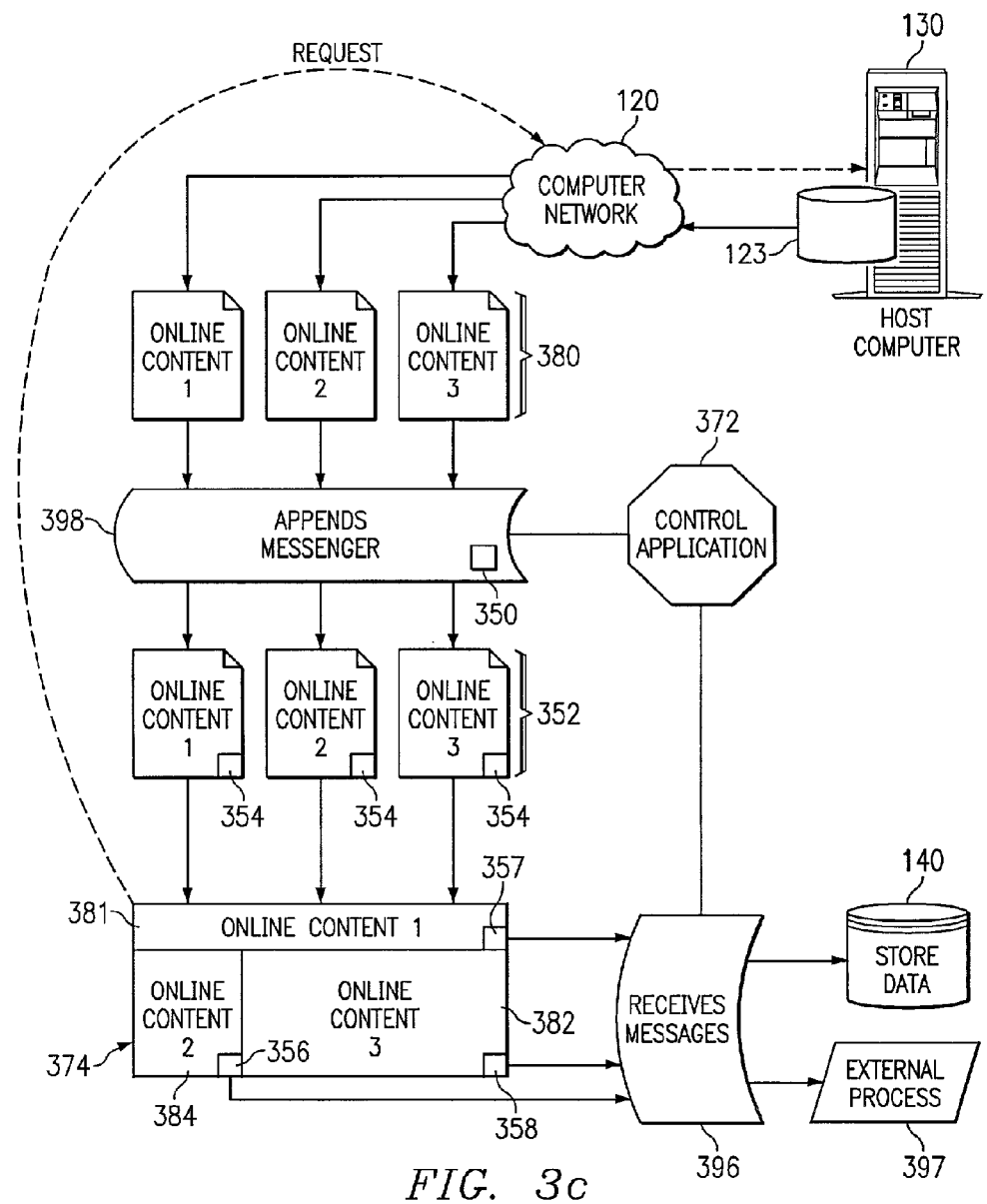
FIG. 3c illustrates an alternative embodiment of a relational block diagram of a system of the invention.

FIG. 3c illustrates an alternative embodiment of a relational block diagram in which a control application 372 is configured to work with a browser-interface 200 to record changes in the visual stimuli being displayed to a user 115 as the user 115 interacts with online-content in web pages 381, 382, and 384. As the user requests information from a host computer 130 via a computer network 120, the host computer 130 responds by sending individual documents 380 of online content. As these documents 380 are being received and loaded by the browser-interface 374, the control program initiates a process block 398 that appends a messenger applet 350 to each document 380 thereby creating a new (modified) version of the document 352 containing a version 354 of the messenger applet 350. As these new documents are instantiated in web pages 381, 382, and 384, the messenger applet 356, 357, and 358 are used to monitor events which may cause changes in the visual stimuli being displayed to the user and communicate related data to another aspect of the control application on 372 that receives these messages 396, and writes this data to a storage device 140, and/or an external process 397.

One skilled in the art will understand that there are many methods for appending information to a document 380 as it is loaded by a browser-interface 374 depending on both the context in which the browser-interface is being utilized and browser dependent interface options. In a preferred embodiment of an Internet WWW browser manufactured by Microsoft Corporation® hosted on a computer running the Microsoft Windows® operating system, a JavaScript function 398 is used to call the DHTML method "CreateElement( )" upon the DocumentComplete event as reported by the browser-interface. In this embodiment, the JavaScript function 398 is used to embed a version 354 of a messenger applet 350 in the form of an ActiveX control, which is appended to each document of online-content 352.

Once the browser-interface 374 instantiates each document 380 in an appropriate web pages 381, 384, and 382, the embedded messenger applets 356, 357, and 358 is then used to report these changes in its corresponding web pages 381, 384, and 382 to a receiving aspect 396 of the control application 372 that receives messages from these messenger applets 356, 357 and 358. In this preferred embodiment, any DHTML event handle including but not limited to, Window.OnScroll (when a user scrolls the online-content within the browser window) and Window.OnResize (when a user resizes the browser window) can be monitored by binding the DHTML event handle to functions of the messenger applets 356, 357 and 358. Upon each DHTML event, any number of properties can be recorded from the browser window, including but not limited to, Window.Location (the network address of the online-content being displayed within the browser window), Document.Body.ClientWidth (the width of the browser window), Document.Body.ClientHeight (the height of the browser window), Document.Body.ScrollWidth (the native width of the online-content being displayed within the browser window), and Document.Body.ScrollHeight (the native height of the online-content being displayed within the browser window).

Third Illustrative Embodiment

Figure 3D:
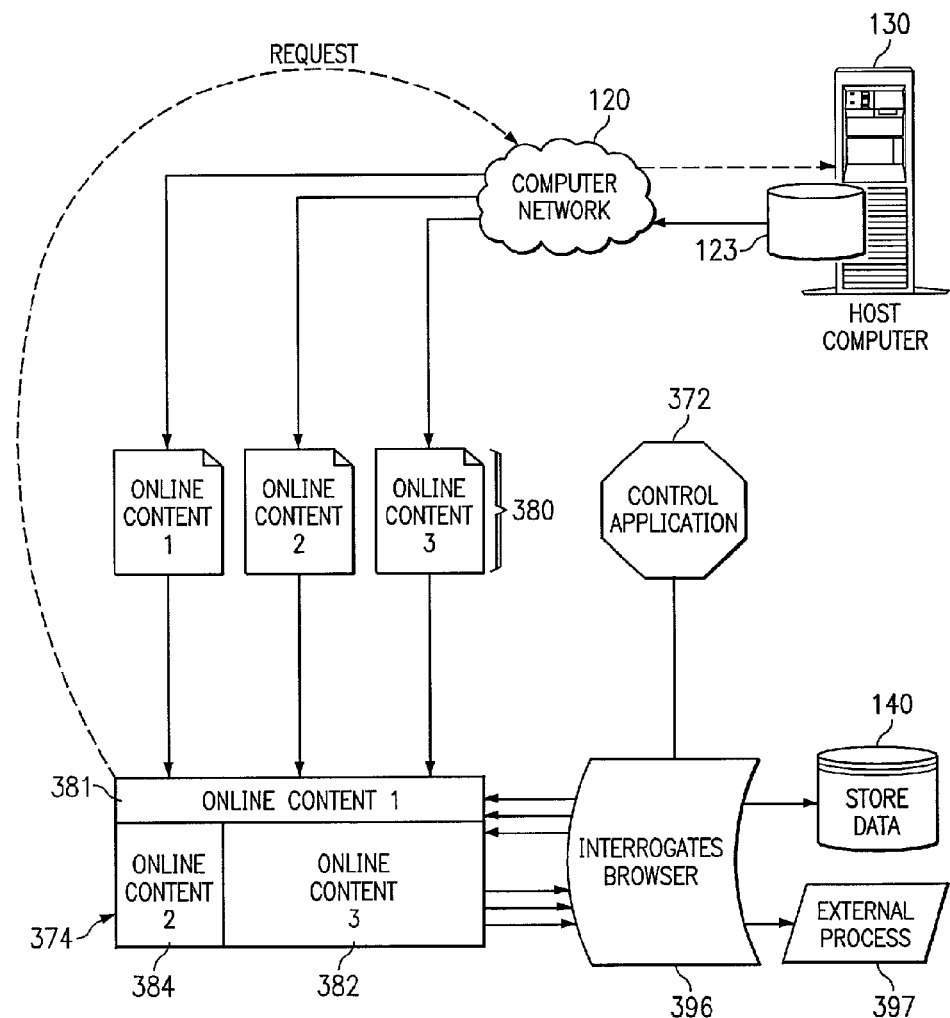
FIG. 3d illustrates an alternative embodiment of a relational block diagram of a system of the invention.

FIG. 3d illustrates an alternative embodiment of a relational block diagram in which a control application 372 is configured to work with a browser-interface 200 to record changes in the visual stimuli being displayed to a user 115 as the user 115 interacts with online-content, via a web page 374. As the user requests information from a host computer 130 via a network 120, the host computer 130 responds by sending individual documents 380 of online-content. These documents 380 are then received and loaded by the browser-interface 374 into corresponding web pages 381, 382, and 384. In this embodiment, one aspect of the control application 372 interrogates the browser interface 396 by polling each instance of web pages 381, 382, and 384. The browser responds to the interrogation process with corresponding data that may be relevant to the visual stimuli being displayed to the user which can then written to a storage device 140, or an external process 397.

One skilled in the art will understand that there are many methods for interrogating a browser interface 396 by polling each instance of a web page 381, 382, and 384 depending on both the context in which the browser-interface is being utilized and browser dependent interface options. In the embodiment of an Internet WWW browser manufactured by Microsoft Corporation® hosted on a computer running the Microsoft Windows® operating system, the interrogation process is first directed at the web page 374 (also known as the parent window) to detect changes in the web page 374. Using this method, any number of properties can be recorded from the browser window, including but not limited to, Window.Location (the network address of the online-content being displayed within the browser window), Document.Body.ClientWidth (the width of the browser window), Document.Body.ClientHeight (the height of the browser window), Document.Body.ScrollWidth (the native width of the online-content being displayed within the browser window), and Document.Body.ScrollHeight (the native height of the online-content being displayed within the browser window). In this embodiment, the same process is used for all subsequent web pages (child windows) 381, 382, and 384.

Illustrative Event Algorithm

The process of gathering and storing parameters may be better understood by describing a preferred embodiment of the event algorithm 300 of FIG. 3. The event algorithm 300 begins in a detect event act 310, in which the event algorithm 300 detects in a browser an event that may change the visual stimuli as observed by a user viewing a browser interface. Next, the event is assigned an identification in an assign ID act 320. Preferably, the ID is an alphanumeric string, but, in any event, is unique to the event detected.

After an event is assigned an ID, the event algorithm 300 determines if the event is one that actually changes the visual stimuli at the browser in an affect visual stimuli query 330. If the affect visual stimuli query determines that the event is one that does not affect the visual stimuli, then the event algorithm 300 proceeds to an end act 340 and the event algorithm 300 terminates. If, however, the event algorithm 300 detects that the event is one that does affect the visual stimuli, then the event algorithm 300 proceeds to a query parameters act 345. The query parameters act 345 provides for event algorithm 300 to detect and gather the various parameters discussed and otherwise known in the art from their respective sources.

Then, in a store parameters act 347, the parameters that were detected and gathered in the query parameters act 345 are stored.

FIG. 4 illustrates the method used to determine the location and area of a primary browser window 450 as it appears within a larger display area 455 as in the screen of a display device, as described by a display algorithm 400 of FIG. 4b. First, in a measure display area act 410, the two-dimensional measurement of the display area 455 is calculated by determining both the horizontal resolution 456, and the vertical resolution 457. One skilled in the art will understand that the specific process for determining this two-dimensional measurement is dependent on the device on which the browser is being operated.

Next, in a measure browser display area act 420, the two-dimensional measurement of the display area occupied by the primary browser window 450 is determined by measuring both its horizontal size 460 and the vertical size 462, along the two-dimensional coordinates for at least one corner 466 of the primary browser window 450 as it is immediately displayed in the display area 455. One skilled in the art will understand that the specific process for determining this two-dimensional measurement and the immediate position of at least one corner is dependent on the browser interface being used and the device on which it is being operated.

Figure 5:
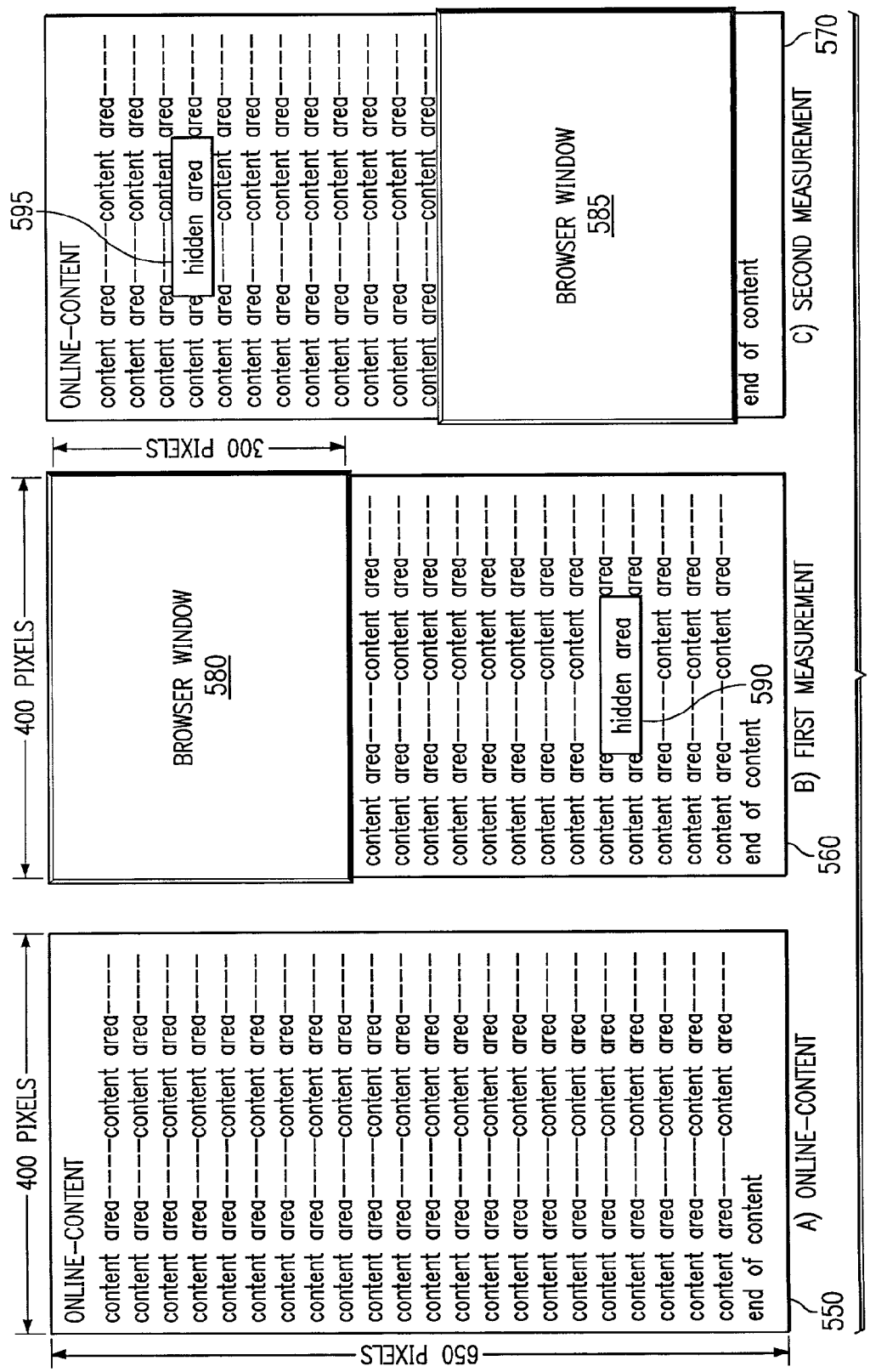
FIG. 5 illustrates a method for determining an area of child web pages that is displayed within a browser window.

FIG. 5 illustrates the method for determining the area of online-content 550, 560, and 570 that is displayed within a browser window 580 and 585 as it may change over time, as described by the content algorithm 500 of FIG. 5b. As illustrated, the example online-content 550 occupies an area of 260,000 pixels. First, in a measure act 510, the browser window 580 is positioned at the top of the online-content 560 with a two-dimensional offset of (0,0). In this position, the browser window 580 is shown to display the first 120,000 pixels of the online-content 560. In this immediate position, 140,000 pixels of online-content 560 are not displayed to a user, shown as hidden area 590. In a second measure act 520, the online-content 570 has been moved vertically within the browser window 585, giving a two-dimensional offset of (0,300). In this position, the browser window 585 is shown to display an area of 120,000 pixels of the online-content 570 located between the two dimensional coordinates of (0,300), (400,300), (400,600), and (0,600). In this position, 140,000 pixels of online-content 570 are not displayed to a user appearing in two disparate areas with the first (a first hidden area 595) located between the two-dimensional coordinates of (0,0), (400,0), (0,299), and (400,299) and the second (a second hidden area) located between the two-dimensional located between the two-dimensional coordinates of (0,601), (400,601), (0,650) and (400,650).

Figure 6:
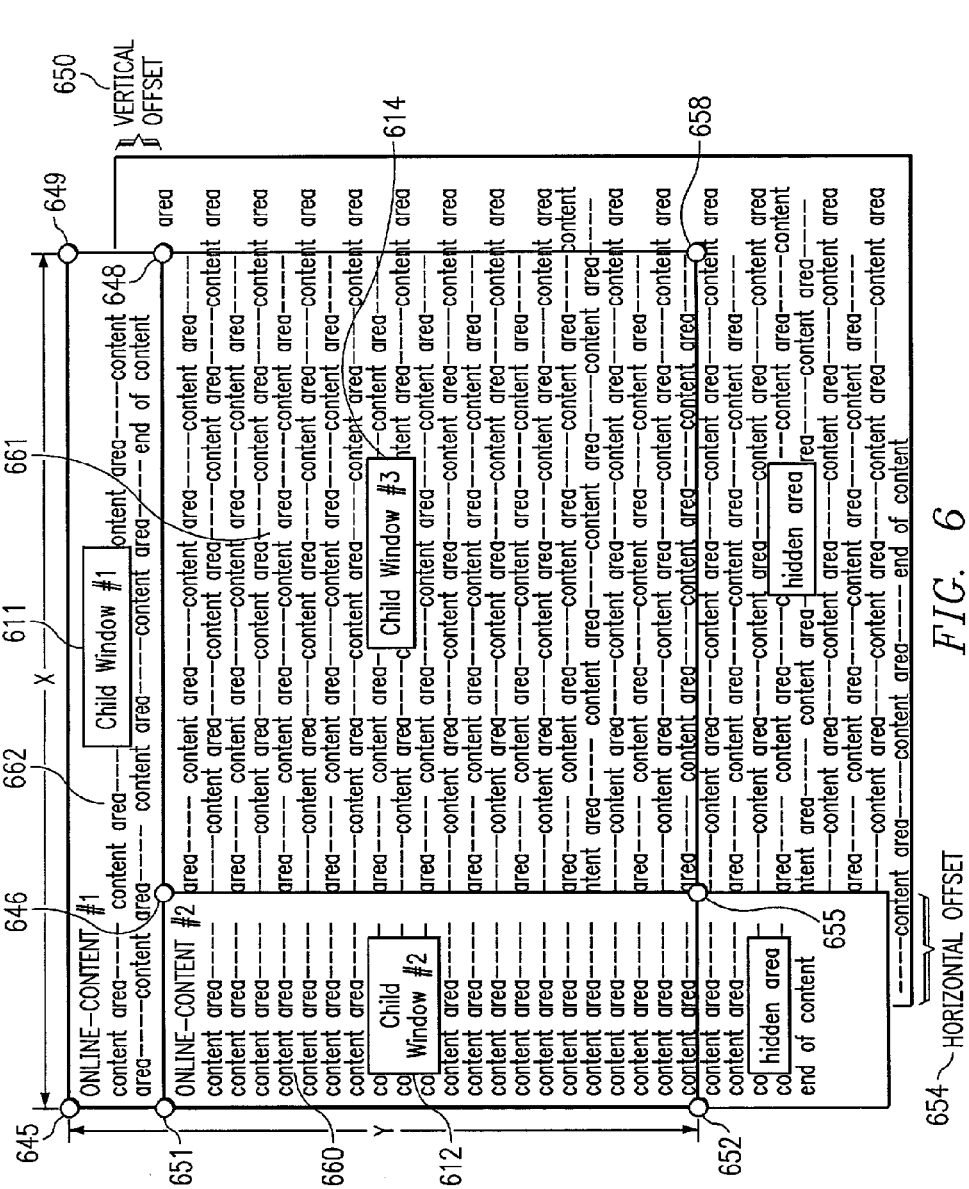
FIG. 6 illustrates a method, used to determine the size and two-dimensional location of multiple child windows.

FIG. 6 illustrates a method, described in FIG. 6b as an offset algorithm 600, used to determine the size and two-dimensional location of multiple child windows 611, 612, and 614 as they might appear within a parent browser window along with the two-dimensional offset of online-content 660, 661, and 662 within each child window 611, 612, and 614. First, the offset algorithm 600 begins with a calculate child boundaries act 610 in which the two-dimensional boundaries for each child window are calculated 645, 651, 646, 649, 648, 652, 655, and 658 giving the area and aspect ratio of each child window 611, 612, and 614. One skilled in the art will understand that the specific process for determining these two-dimensional boundaries is dependent on the browser interface being used and the device on which it is being operated.

Next, in a calculate offset act 620, the immediate two-dimensional offset of the online-content 660, 661, and 662 for each child window 611, 612, and 614 is calculated. The two-dimensional offset 654 and 650 of the online-content 660, 661, and 662 is internally represented by a single two-dimensional measurement for each child window 611, 612, and 614.

Figure 7:
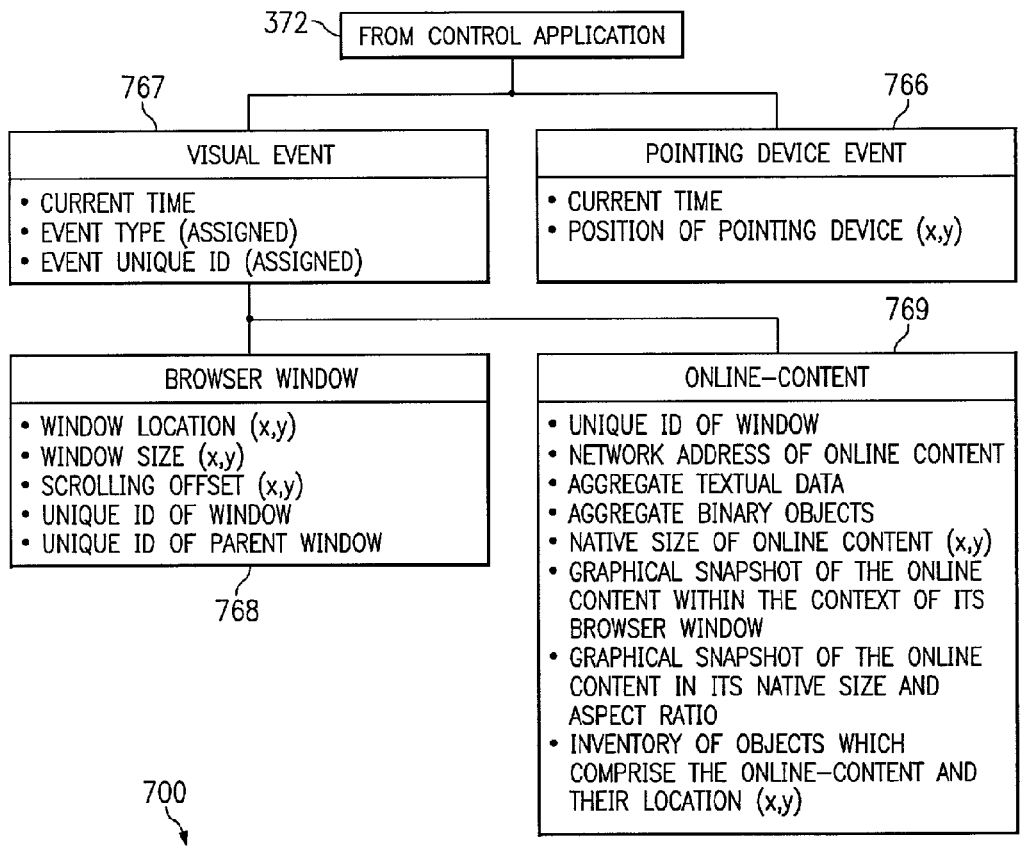
FIG. 7 illustrates a hierarchical structure implemented by a method for organizing and storing measurements of parameters and other data.
Figure 7B:
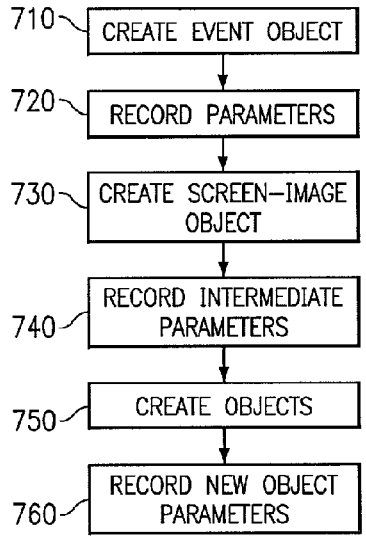
FIG. 7b is a flow-diagram of an organization algorithm 700.

FIG. 7 illustrates a hierarchical structure implemented by a method for organizing and storing measurements of parameters and other data, illustrated in FIG. 7b as an organization algorithm 700. The hierarchical structure originates from the control application 372, and organizes parameters and data that impact the immediate visual stimuli being displayed to the user.

In a preferred embodiment, the control algorithm 700 begins in a create event object act 710 in which the control application 372 creates objects depending on the type of event observed. Any event-specific parameters are then recorded in a record parameters act 720. For example, in the case of a change in the two-dimensional location of the pointing device, a pointing device event 766 is created containing the current time and the two-dimensional position of the pointing device. In the case of a change in the visual stimuli within one or more windows of the browser interface, a visual event 767 is created containing the current time, an assigned event type, and the unique id assigned to the event by the control program. A visual event 767 may require that additional information be recorded.

Next, in a create screen image object act 730, in the case of the browser window, a browser window object 768 is created containing the two-dimensional location of the browser window, the size of the browser window expressed as its two-dimensional boundaries, the two-dimensional offset of the online-content immediately displayed in the browser window, the unique identifier for the browser window, and the unique identifier of the browser window's parent window (in the event the browser window has no parent, this property is set to a null value). These parameters are recorded in a record intermediate parameters act 740.

In the case of the online-content, a create objects act 750 creates an online content object 769 containing the unique id of the browser window in which the content is being displayed, the network address, textual data, and binary objects that comprise the online-content being immediately displayed in the browser window, the native size of the online-content expressed as its two-dimensional boundaries are recorded along with a graphical screen snapshots of the online-content both in its native format and visual format as bound by the browser window. These objects are recorded in a record new object parameters act 760. In addition, an inventory of the objects which comprise the online content along with their two-dimensional location is recorded. Other objects, such as child objects, and online-content objects, can be likewise created and recorded.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A system that enables the recording of user-viewable visual stimuli comprising:
   a control application configured to, using a processor device, execute code that causes recording of a user-viewable stimulus at a first time, wherein the recording of a user-viewable stimulus at the first time is performed by:

detecting a visual event;
observing visual characteristics of the visual event;
verifying that the visual event involves one or more parameters that change a viewable stimulus; and
recording at least one of the parameters; and
a storage platform, coupled to the processor device, configured to store data from the user-viewable stimulus wherein the stored data is configured to be used to recreate, at a second time different from the first time, at least a portion of the user-viewable stimulus.

2. The system of claim 1 further comprising a user interaction device coupled to the control application.

3. The system of claim 1 wherein the user-viewable stimulus is observable in a browser coupled to the control application.

4. The system of claim 1 further comprising a browser interface coupled to a server.

5. The system of claim 1 further comprising a network coupled to the control application.

6. The system of claim 1 wherein the storage platform comprises cached memory.

7. The system of claim 1 wherein the system is maintained in a mobile device.

8. The system of claim 5 wherein the network is the Internet.

9. The system of claim 5 further comprising a host computer coupled to the network, the host computer for communicating with the control application.

10. The system of claim 1 further comprising an eye-tracking device coupled to the control application.

11. The system of claim 10 wherein the eye-tracking device is enabled to monitor pupil dilation.

12. A method of recording a user-viewable stimulus, the method comprising:
recording a user-viewable stimulus at a first time, the recording comprising:
detecting a visual event;
receiving information specifying the detected visual event;
observing one or more visual characteristics of the visual event;
verifying that the visual characteristics involve one or more parameters that affect how the visual event is displayed;
recording at least one of the one or more parameters; and
recreating, at a second time different from the first time, at least a portion of the user-viewable stimulus by:
reading one or more of the recorded parameters; and
reconstructing at least a part of the visual event wherein the visual characteristics corresponding to the recorded parameters are included in the reconstructed part of the visual event.

13. The method of claim 12 wherein at least one of the recorded parameters stores a network address corresponding to of all online content immediately displayed within a browser window.

14. The method of claim 12 wherein at least one of the recorded parameters indicates a two-dimensional offset of online content as the online content is displayed within a browser window.

15. A system configured to record browser-viewable visual stimuli comprising:
a control application configured to, using a processor device, record a user-viewable stimulus displayed at a first time, wherein the recording of a user-viewable stimulus at the first time is performed by:
detecting a visual event;
observing visual characteristics of the visual event;
verifying that the visual event involves one or more parameters that change a viewable stimulus; and
recording at least one of the parameters;
a browser object in communication with the control application;
an application that receives messages coupled to the browser object and the control application; and
a web page coupled to the browser object configured to reconstruct, at a second time different from the first time, at least a part of the user-viewable stimulus based on the received messages.

16. The system of claim 15 further comprising a computer network for delivering online content to the web page, the network in communication with the web page.

17. The system of claim 15 further comprising a component configured to categorize and filter events corresponding to the user-viewable stimulus as to each event's relevance to an event being presented to a user.

18. The method of claim 12 wherein verifying that the visual characteristics involve one or more parameters that affect how the visual event is displayed comprises determining that the parameters contain information relevant to a visual change.

19. The method of claim 12 wherein one or more of the parameters contain information relating to a property of at least one browser object, the property being one of: a horizontal position, a vertical position, a size of a window, and a network address.

20. The method of claim 12 wherein one or more of the parameters contains information from a Document Object Model of web content.

21. The method of claim 12 wherein one or more visual characteristics is one or more of a size and location of a child window within a parent window.

22. The system of claim 1 wherein the recorded user-viewable stimulus of the first time is in response to a user interacting with online content.

23. The system of claim 1 wherein the control application is a browser embedded messenger applet.

* * * * *